United States Patent

[11] 3,555,964

| [72] | Inventor | Lawrence T. Fleming<br>625 S. Oak Knoll Ave., Pasadena, Calif. 91106 |
|------|----------|---|
| [21] | Appl. No. | 768,860 |
| [22] | Filed | Oct. 18, 1968 |
| [45] | Patented | Jan. 19, 1971 |

[54] INSULATION STRIPPING DEVICE
4 Claims, 11 Drawing Figs.

[52] U.S. Cl. ........................................................ 90/14, 90/11; 77/67, 29/103
[51] Int. Cl. ........................................................ B23c 3/00, B23b 51/00; B26d 1/12
[50] Field of Search ........................................... 90/11, 14; 77/67, 73.5, 34.5; 144/219, 136, 218; 32/48; 145/125, 123

[56] References Cited
UNITED STATES PATENTS

| 642,677 | 2/1900 | Childs | 77/67 |
| 3,037,405 | 6/1962 | Steyskal | 77/34.5 |
| 3,082,650 | 3/1963 | Young | 77/34.5X |

FOREIGN PATENTS

| 842,133 | 7/1960 | Great Britain | 29/103—1 |

*Primary Examiner*—Gil Weidenfeld

ABSTRACT: A device strips circular areas of insulation to expose the flat conductors in flexible printed circuits, flat electrical cables, multilayer circuit boards and the like, to permit making electrical connections thereto. The basic principle of operation resembles that of an end mill or drilling machine. The new machine employs rotating cutters of novel shape which cut more readily through insulating films and sheets than through metals such as copper, and the machine has a precision depth stop. Both features prevent cutting through the thin foil conductors. The depth stop may be set so that the cutter penetrates the foil by a small fraction of its thickness, exposing a clean metal surface for soldering. The bottom of the cut is visible during the cutting operation.

PATENTED JAN 19 1971
3,555,964
SHEET 1 OF 2
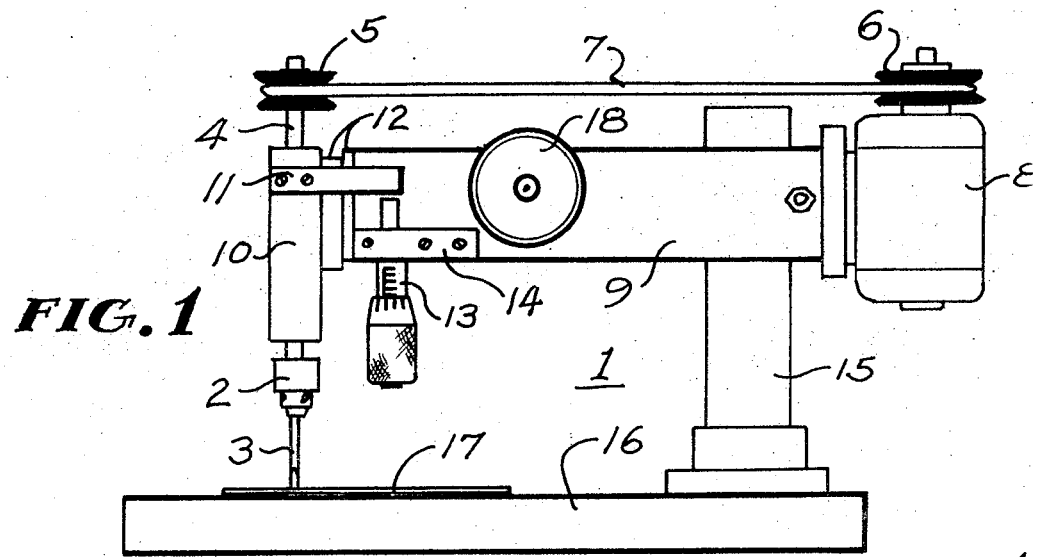
FIG. 1
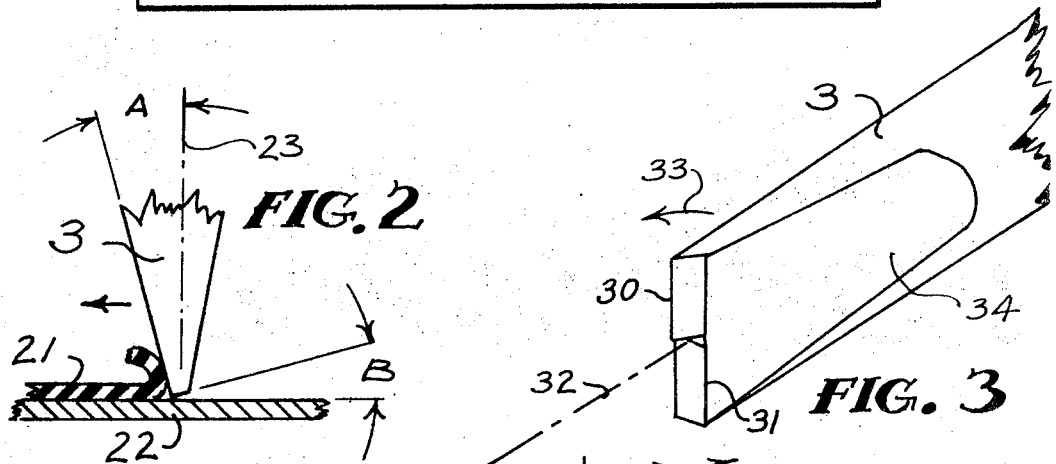
FIG. 2
FIG. 3
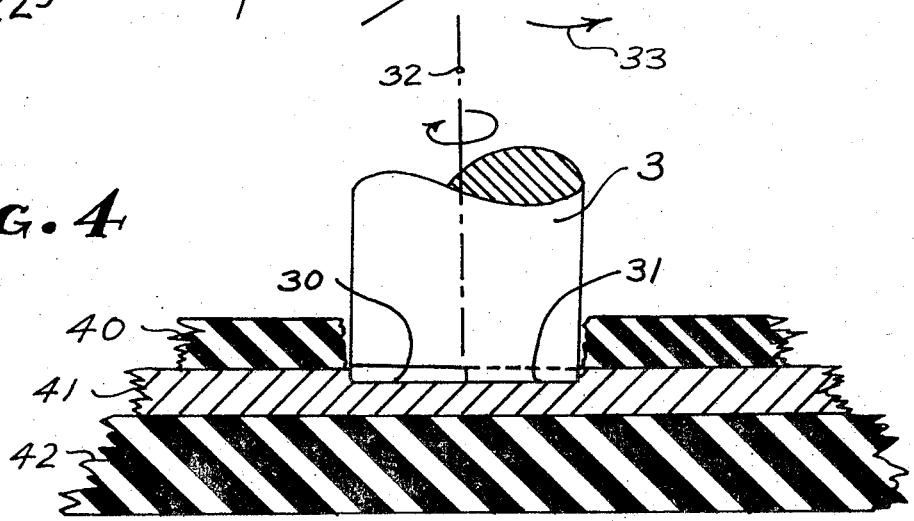
FIG. 4
INVENTOR
Lawrence T. Fleming

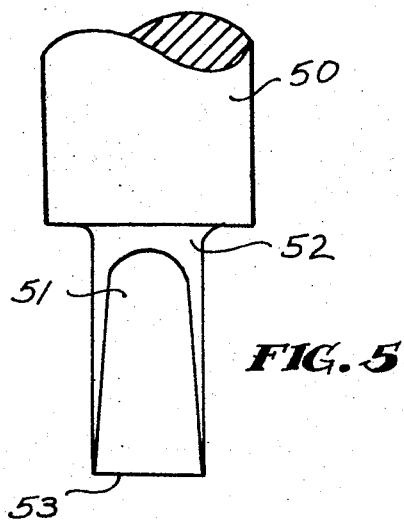
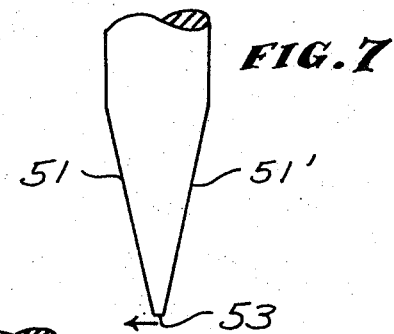
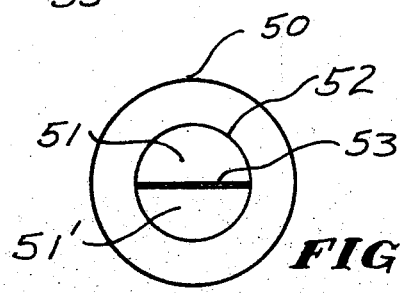
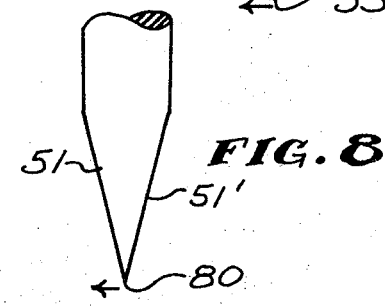
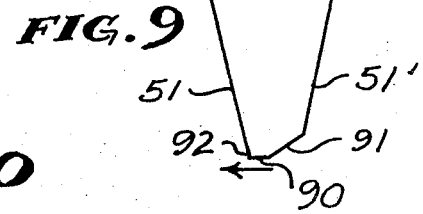
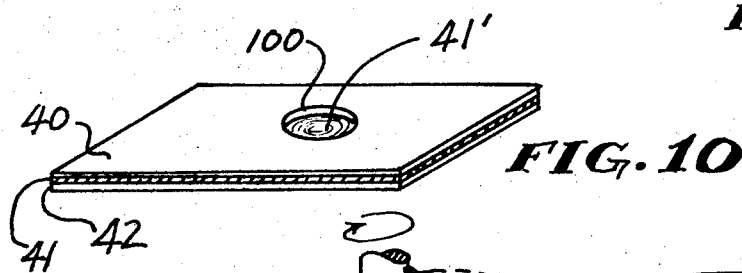
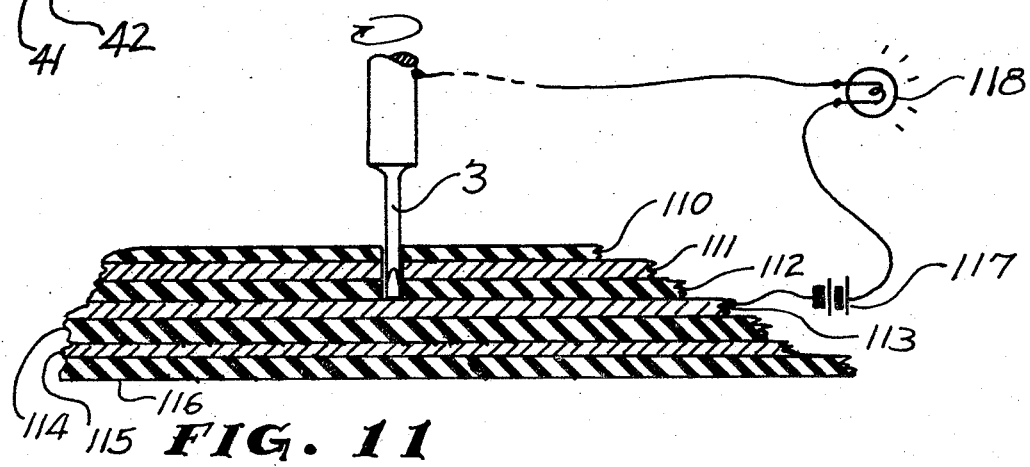

INSULATION STRIPPING DEVICE

This invention relates to machines and methods for stripping insulation and exposing metal foil conductors for electrical contact or soldering, in flexible electronic printed circuits, flat electrical cable, and multilayer printed circuit boards.

In flexible circuits and flat cables, etched foil conductors are sandwiched in between layers of relatively thin insulating film or sheet material, and bonded thereto. The film is usually of a plastic material. Various strong, tough plastics are in present use which resist the action of heat and chemicals.

Multilayer circuit boards contain alternate layers of etched metallic foil conductors and of insulating material, all bonded together into a stiff structure which may, in current practice, contain 13 or more separate conducting layers.

Flexible circuits and flat cables require the removal of areas of insulating film from over the conductors in order to make electrical connections thereto. Present methods of such removal or stripping of the insulation include the use of heated knives, the use of chemicals, and the prepunching of appropriate holes in an insulating film before assembly. Because of the trend toward the use of more resistant plastics, hot blade or knife stripping and chemical stripping are more difficult than heretofore. Prepunching the insulating film requires its assembly with the etched foil circuit pattern in accurate registration, which the industry finds undesirably slow, costly, and prone to error.

Multilayer circuit boards, after bonding together, are sometimes found to contain breaks or open circuits in their intermediate layers. Many boards of this type are complex and costly, and so repairs are economically justified. A prior practice in such repairing has been to delve into the board with a dentist's drill, expose conductors on either side of the break, then solder a wire jumper across the break. Dentist's burrs are not well suited to such a purpose, nor are the handpieces in which they are mounted; there is inadequate protection against drilling too deep, through the thin foil conductor to which it was desired to make connections. Often in practice, the drilling is stopped a safe distance from the desired depth, and the remainder of the cutting performed with dentist's hand implements. This process is tedious.

The present invention provides an improved means of exposing conductors in flexible circuits, flat cable, and multilayer circuit boards with speed and precision, and with greatly reduced hazards of cutting through the thin conductors. The invention uses a rotating cutter, in the manner of a drilling machine or an end mill. The cutter is provided with a novel shape which affords visibility of the bottom of the hole being cut during the operation. The novel cutter is used in a machine which has novel means of precision depth control. These features in combination provide the capability for quickly and safely removing insulating layers from thin flat conductors, with substantial improvements in speed and economy over the prior art methods.

For a better understanding of the invention, it will now be described in detail in connection with the accompanying drawing, in which:

FIG. 1 is a simplified side view of a complete machine according to the invention;

FIG. 2 is a magnified diagrammatic sectional view illustrating the angles of a cutter according to the invention;

FIG. 3 is a magnified partial isometric view of the tip portion of one form of cutter according to the invention;

FIG. 4 is a partial sectional view, greatly magnified, of the relation between the cutter tip and a laminated workpiece;

FIG. 5 is a side view of the tip portion of another form of cutter, magnified;

FIG. 6 is an end view of FIG. 5;

FIG. 7 is a magnified side view of the end portion of the FIGS. 5 and 6 modification of the cutter of the invention;

FIG. 8 is a magnified side view of the end portion of another modification of the cutter of the invention;

FIG. 9 is a magnified side view of the end portion of another modification of the cutter of the invention;

FIG. 10 is a magnified, partially diagrammatic isometric view of a piece of laminated circuit material that has been spot-stripped according to the invention;

FIG. 11 is a magnified diagrammatic sectional view of a portion of a multilayer circuit board, showing the nature of the penetration of a cutter of the invention thereinto, and also showing an electrical indicator circuit.

In FIG. 1, a general type of machine is shown in simplified form, which is suitable for spot-stripping of insulation according to the invention. The machine, indicated generally at 1, may comprise a chuck 2 holding a cutter 3, the chuck 2 being mounted on the end of a rotatable spindle 4. The spindle 4 may be driven through a pulley 5, a belt 7, and another pulley 6, which is attached to the shaft of a motor 8. The spindle 4 and motor 8 are mounted on an arm 9 which is clamped to a column 15, after the manner of a drill press. Spindle shaft 4 rotates in bearings (not shown) in a carrier 10. The spindle carrier 10 is attached to a slide mechanism shown generally at 12, which permits vertical movement or feed of the spindle assembly 4, 10, over a certain range. Vertical motion or feed of the spindle assembly 4, 10 may be controlled by a hand wheel or knob 18 or other conventional device, through a rack and pinion mechanism or other suitable means, not shown. The base of the machine is indicated as a plate or the like 16, and the workpiece at 17. Thus the cutter 3 may be fed downward into the workpiece 17 by rotation of the hand wheel or knob 18, or by other known manual means.

The depth of this downward feed may be limited or stopped by means of a micrometer screw and anvil assembly 11, 13, 14. In the case shown, an anvil or stop 11 is shown attached to the spindle shaft carrier 10. On the stationary arm 9 is mounted a micrometer head 13 via a rigid bracket 14. Thus the downward movement of the spindle and cutter 10, 2, 3 is arrested by contact of the anvil 11 against the tip of the micrometer head 13.

In the practical use of the invention, the micrometer head 13 may be adjusted so that the tip of the cutter 3 can just graze the top surface of the workpiece 17. It then may be advanced by an amount slightly less than the known thickness of the insulating film over the conducting layer of workpiece 13, and the cutter lowered into the work by means of hand control 18. This advance may typically be of the order of .001 to .005 inches. The cutter is then withdrawn and the bottom of the hole visually inspected. If no metal shows, the micrometer stop is advance .0005 to .001 inch at a time, until the glint of copper or other conductor becomes just visible. The micrometer stop is then advanced .0002 to .001 inch more and a final cut taken, which will expose a clean metal surface of conductor, suitable for soldering or other electrical connection. A typical thickness for the copper foil used in flexible and other printed circuits is .0027 inch.

The above process takes from 10 to 20 seconds, in practice. After it is completed, more spots can be stripped on the same workpiece with little or no further adjustment of the stop. A few minor adjustments may be made from time to time in response to the visual appearance of the bottom of the hole: this is safe, because of the differential preference of the cutters of the invention for cutting insulation. This will be described below.

FIG. 2 shows diagrammatically the relation of a section of a cutter 3 and a workpiece 21, 22. The cutter tip, moving to the left in the direction of the arrow, cuts away a surface layer or portion 21. In the usual nomenclature of cutting tool angles, the angle A is called to the rake angle, and the angle B the backoff or clearance angle. If the angle A is clockwise of the vertical line 23, it is known as positive rake; positive rake is common with most lathe tools and milling cutters. The angle A shown in FIG. 2 is negative rake. A cutter with negative rake has little or no tendency to dig into the workpiece, but requires more feed force. The optimum backoff or clearance angle B is a function of the hardness of the material being cut, and of the feed force required. I have found that in a soft, ductile material like copper, a small backoff or clearance angle B may be desirable as reducing the feed force required, but that if the angle B is too large, the cutter cuts through the material too easily. With small clearance angles of the order of 0 to 6 degrees, and a moderate negative rake angle A, the cutter will tend to burnish the metal rather than to cut through it; it will require definite urging to go through it.

In contrast, I have discovered that a cutter with negative rake and a small or zero clearance angle will cut very readily through the common plastic insulating materials, including polyesters, polyamides, and polytetrafluorethanes, as well as the glass fiber-epoxy materials, once enough force is applied on the feed control to start the cutting process. When, however, such a cutter encounters soft ductile metal, it immediately displays substantially increased resistance, so that a definite effort is required to make it continue cutting.

In the case of conventional cutters such as ordinary end mills, the positive rake angle makes the cutter tend to pull into the work. This tendency causes failure in attempts to cut down to a thin ductile metal conductor without cutting through it.

Moreover, prior cutters having a plurality of flutes tend to obscure the view of the bottom of the hole, which is a useful thing to monitor when stripping insulation for the purposes of the invention. The present cutter has but a few, e.g. two, flutes or cutting elements and a small negative rake angle, which makes it an elongated wedge-shaped affair, which does not substantially obscure the bottom of the hole for visual monitoring.

FIG. 3 is an isometric partial view of the tip portion of one form of cutter according to the invention. The axis of the cutter 3 is indicated by centerline 32. Opposite faces are ground away at a clearance angle corresponding to angle A of FIG. 2; one of the resulting faces is shown at 34, the opposite face being not shown because it is on the other side. The tips 30, 31 of the cutter in FIG. 3 may be ground to clearance or backoff angles corresponding to angle B, FIG. 2, so that when the cutter 3 is rotated in the direction of the arrows 33 (FIG. 3), the cutting action will be as indicated in FIG. 2. It will be understood that all cutters according to the invention are flat-bottomed, and hence that the cutting edges 30, 31 lie in the same plane, which plane is perpendicular to the centerline 32. Such cutters may be ground, it is understood, from cylindrical rodlike metal or carbide stock, such as drill blanks.

FIG. 4 diagrams the penetration of a cutter such as that of FIG. 3 into a typical flexible printed circuit, to expose the conductor: all greatly magnified. The cutter 3, rotating around its axis 32, has cut through the upper layer of insulation 40 and part way into the metallic conductor layer 41. At this point, cutting is stopped. The cutting edges of cutter 3 are indicated at 30, 31, similarly to the showing of FIG. 3. The lower layer of insulation is indicated at 42. In practice, typical thicknesses for the layers 40, 41, 42 may be respectively 0.002, 0.0027, and 0.0005 inches, and a typical diameter for the tip of the cutter 3 0.050 inch.

FIG. 5 illustrates a modification of the cutter shape of FIG. 3, and FIG. 6 is an end view of FIG. 5. In this case, the clearance angle B (FIG. 2) is zero. The shaping of the cutter consists simply of grinding the relatively flat or flat faces 51, 51' on opposite sides of the cylindrical body 52. The body portion 52 may be ground or turned down from the main body portion 50, to provide spot diameters to meet requirements. The whole shape is similar to a screwdriver bit. The flat end portion 53 of the cutter corresponds to the face of the cutter of FIG. 2 but with a clearance angle of zero.

FIG. 7 is a side view of such a cutter, having a blunt tip with zero clearance angle.

FIG. 8 is a side view of the tip of a modification, wherein the flat faces such as 51, 51' (FIG. 5) meet each other at a sharp edge 80, leaving no flat end such as that shown at 53 in FIG. 6. This modification has shown satisfactory results in cutting through the softer plastics, or for light service. Its manufacture is simple, as is that of the modification of FIG. 5.

FIG. 9 illustrates a side view of the tip of another modification of the cutter tip, wherein a relatively blunt tip, corresponding to tip 53 FIGS. 6 and 7), is divided into two portions 90, 91. Portion 90 may have zero clearance angle, and portion 91 be relieved at an angle as shown, to reduce the area of surfaces 90 in rubbing contact with the workpiece, and yet permit increased strength and heat conductivity in the vicinity of the cutting edge 92.

In respect to FIGS. 5 to 9, it is understood that the end of each cutter may be generally of a chisel shape, perpendicular to the axis of the cutter, and symmetrical about the axis.

FIG. 10 illustrates in semidiagrammatic form a hole, spot, or cavity that has been cut in a piece of flexible circuit material to expose the conducting layer. The top insulating film layer is indicated at 40, the metallic conductor layer at 41, and the bottom insulating layer or substrate at 42. The cavity is indicated at 100, and the exposed surface portion of conducting layer thereby exposed at 41'. The bottom of cavity 100 will, in practice, normally show circular scratches in the metal due to the small or microscopic irregularities in the face of the cutter.

FIG. 11 shows diagrammatically the exposing of a conductor in a multilayer circuit board by means of a cutter and machine according to the invention, with the aid of a lamp or other electrical indicating device to indicate when contact between the cutter and the desired conductor has been made. Layers of the multilayer board are indicated as conductors at 111, 113, and 115; and insulating layers at 110, 112, 114, and 116. It being assumed that cutter 3 is desired to expose, and slightly penetrate, conducting layer 113, electrical connections are made to conducting layer or printed circuit 113, and to cutter 3, e.g., via the frame of machine 1 (FIG. 1). A battery or other source of electrical energy 117 and a lamp or other electrical indicating device 118 are connected in series between the desired conducting layer 113 and the cutter 3. Then, when the rotating cutter 3 just reaches the desired conducting layer 113, the indicator 118 will say so, and the feed of the machine 1 (FIG. 1) by a small amount, such as .0005 inch, and advance the feed to the stop again, as by control 18 (FIG. 1). Successive readjustments of the depth stop, in case of doubt as to the depth of the layer such as 113, are quite feasible, the micrometer 13 being advanced .001 inch or so at a time, and the downward feed repeated until the indicator 118 shows contact. Since the shape of the cutters of the invention permits ready viewing, optically, of the bottom of the hole, it is thoroughly feasible to sneak up, bit by bit, on the correct depth, to confirm it by the indicator 118, and then to increase it by .0002 inch or so, to clean and burnish the ocnductor's surface, all without danger of cutting through the conductor.

Since the cutters of the invention have no tendency to grab, once they hit the ductile metal of the conducting layer, it is entirely feasible to make repeated cuttings, using the feed of the machine (FIG. 1), at increments of depth of small magnitude, such as .0001 to .002 inch, without any danger of cutting beyond the depth that is set.

I claim:

1. An insulation stripping device for a flat circuit having metal foil conductors laminated between relatively thin insulating film layers, comprising:
   a rotatable cutter having a cylindrical body and a tapered end portion;
   straight cutting edges perpendicular to its axis of rotation at the tip of said end portion;
   said straight cutting edges forming at least one substantially continuous cutting edge along the entire length thereof, the leading boundary planes of said edges having a relatively small angle of negative rake;
   means to rotate said cutter;
   means to advance said cutter axially into said flat circuit; and
   sensitive means to precisely control the depth of penetration of said cutter, whereby said device is able to remove several thousandths of an inch of said film in increments of less than .001 of an inch without cutting through said foil.

2. An insulation stripping device as in claim 1, wherein:

said end portion is bounded on opposite sides by two plane surfaces each inclined toward the axis of said body at a relatively small angle; and said angle constituting said negative rake.

3. An insulation stripping device as in claim 2, wherein:
said plane surfaces intersect a pair of tip surfaces; and
said tip surfaces being inclined from the normal to said axis to provide clearance angles.

4. An insulation stripping device as in claim 3, wherein:
said tip surfaces are relatively narrow; and
whereby the area swept by said cutting edges is visible during the cutting operation.